(12) United States Patent
Bhageria et al.

(10) Patent No.: US 10,296,097 B2
(45) Date of Patent: May 21, 2019

(54) CONTROLLING A COMPUTER SYSTEM USING EPIDERMAL ELECTRONIC DEVICES

(71) Applicant: INTERNATIONAL BUSINESS MACHINES CORPORATION, Armonk, NY (US)

(72) Inventors: Gopal K. Bhageria, Kolkata (IN); Vijay Ekambaram, Bangalore (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 15/211,101

(22) Filed: Jul. 15, 2016

(65) Prior Publication Data
US 2018/0018070 A1  Jan. 18, 2018

(51) Int. Cl.
*G06F 3/01* (2006.01)

(52) U.S. Cl.
CPC .............. *G06F 3/017* (2013.01); *G06F 3/011* (2013.01); *G06F 3/014* (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| 8,194,921 | B2 * | 6/2012 | Kongqiao | G06F 3/017 |
| | | | | 382/103 |
| 9,002,099 | B2 | 4/2015 | Litvak et al. | |
| 9,619,024 | B2 * | 4/2017 | Jiang | G06F 3/015 |
| 9,720,510 | B2 * | 8/2017 | Di Censo | G06F 3/017 |
| 9,720,515 | B2 * | 8/2017 | Wagner | G06F 3/017 |
| 10,095,473 | B2 * | 10/2018 | Lancaster | B60R 16/0373 |
| 2004/0068409 | A1 * | 4/2004 | Tanaka | B25J 9/1656 |
| | | | | 704/272 |

(Continued)

OTHER PUBLICATIONS

"Tattoo biobatteries produce power from sweat (video)", Aug. 13, 2014, https://www.acs.org/content/acs/en/pressroom/newsreleases/2014/august/tattoo-biobatteries-produce-power-from-sweat-video.html, 4 pgs.

(Continued)

*Primary Examiner* — William Lu
(74) *Attorney, Agent, or Firm* — Michael O'Keefe; Matthew M. Hulihan; Heslin Rothenberg Farley & Mesiti PC

(57) ABSTRACT

Control of a computer system using epidermal electronic devices. Movement of a first epidermal electronic device (EED) relative to a second EED is detected based on electronic signals of the first and second EEDs, the first EED being associated with a first portion of a user's body and the second EED being associated with a second portion of the user's body. Movement of the first portion of the user's body relative to the second portion of the user's body is determine based on the detected movement of the first EED relative to the second EED. A computer-recognizable input event correlated to the determined movement is identified, and a computer function associated with the computer-recognizable input event is performed.

16 Claims, 6 Drawing Sheets

(56) References Cited

U.S. PATENT DOCUMENTS

| | | | |
|---|---|---|---|
| 2008/0036737 A1* | 2/2008 | Hernandez-Rebollar | ................... G06F 1/163 345/158 |
| 2008/0309632 A1 | 12/2008 | Westerman et al. | |
| 2009/0326406 A1* | 12/2009 | Tan | .......................... G06F 3/015 600/546 |
| 2012/0083705 A1* | 4/2012 | Yuen | ..................... A61B 5/0002 600/508 |
| 2012/0319940 A1* | 12/2012 | Bress | ....................... G06F 3/014 345/156 |
| 2013/0265229 A1* | 10/2013 | Forutanpour | ........... G06F 3/014 345/158 |
| 2013/0307670 A1* | 11/2013 | Ramaci | ............... G06F 21/6245 340/5.82 |
| 2014/0046922 A1* | 2/2014 | Crook | ............... G06F 17/30648 707/706 |
| 2015/0193005 A1* | 7/2015 | Di Censo | ................ G06F 3/038 345/156 |
| 2015/0220158 A1* | 8/2015 | Elangovan | .............. G06F 3/017 345/156 |
| 2015/0241976 A1* | 8/2015 | Zhao | ....................... G06F 3/017 345/158 |
| 2016/0015972 A1* | 1/2016 | Hyde | ...................... H02J 7/025 607/48 |
| 2016/0089980 A1* | 3/2016 | Kurahashi | ............... G06F 3/013 345/156 |

OTHER PUBLICATIONS

Hewitt, John, "Smart tattoo generates electricity from sweat, could power future wearable computers", Aug. 15, 2014, http://www.extremetech.com/extreme/188088-smart-tattoo-generates-power-from-sweat, 12 pgs.

Basak, Saikat, "Control mouse using hand gestures—Ishara", Dec. 1, 2013, https://www.youtube.com/watch?v=B1_xtdR8pn4, 5 pgs.

Anthony, Sebastian, "Microsoft demos muscle-computer interface, air Guitar Hero now a reality", Jul. 31, 2012, http://www.extremetech.com/extreme/133732-microsoft-demos-muscle-computer-interface-air-guitar-hero-now-a-reality, 11 pgs.

YouTube, "Gesture control Windows 8 Operating System with the Fluid Motion", Sep. 22, 2013, https://www.youtube.com/watch?v=GRSgw9nVEzM,3 pgs.

YouTube, "Control your computer without touching it", Jan. 4, 2013, https://www.youtube.com/watch?v=uXilmb5BzGE, 3 pgs.

Lamb, Robert, "How Electronic Tattoos Work", Jun. 12, 2012, http://electronics.howstuffworks.com/gadgets/other-gadgets/electronic-tattoo.htm, 6 pgs.

Elgan, Mike, "Ready for your electronic tattoo?", Mar. 15, 2014, http://www.computerworld.com/article/2488638/emerging-technology/ready-for-your-electronic-tattoo-.html?page=2, 3 pgs.

These Last Days News, "Motorola Patents E-Tattoo Mark of the Best, That Can Also Read Your Thoughts by Listening to Unvocalized Words in Your Throat . . . ", Nov. 24, 2015, 2 pgs.

Science of Inovation: Electronic Tattoo, https://science360.gov/obj/video/432449c2-5725-4ff0-b2c3-6a7d68b3d325/science-innovation-electronic-tattoo, 2 pgs.

ThalmicLabs, "We're changing the way people interact with technology", https://www.thalmic.com/, 8 pgs.

Wikipedia, "Human-computer interaction", last modified Jun. 9, 2016, https://en.wikipedia.org/wiki/Human%E2%80%93computer_interaction, 11 pgs.

Mead, Derek, "Laugh at Google's E-Tattoo All You Want, You'll be Wearing One Soon", Nov. 12, 2013, http://motherboard.vice.com/blog/laugh-at-googles-e-tattoo-all-you-want-youll-be-wearing-one-soon, 9 pgs.

"Introducing the World's First Electronic Ink Tattoo", Apr. 1, 2015, http://www.emergeinteractive.com/insights/detail/introducing-the-worlds-first-electronic-ink-tattoo, 5 pgs.

* cited by examiner

CONTROLLING A COMPUTER SYSTEM USING EPIDERMAL ELECTRONIC DEVICES

BACKGROUND

Current configurations of computer systems and devices enable control thereof via user input, such as touch input by a user's fingers (a thumb and index finger combination, for instance). The input is interpreted by the computer system, which performs operations based on the input. In many instances, the user physically interacts with a touchpad, touchscreen, or similar input device making it difficult for the user to provide the input while maintaining a distance from the computer system.

SUMMARY

Shortcomings of the prior art are overcome and additional advantages are provided through the provision of a computer-implemented method that includes detecting movement of a first epidermal electronic device relative to a second epidermal electronic device based on electronic signals of the first and second epidermal electronic devices. The first epidermal electronic device is associated with a first portion of a body of a user and the second epidermal electronic device is associated with a second portion of the body of the user. The method further includes determining movement of the first portion of the body of the user relative to the second portion of the body of the user based on the detected movement of the first epidermal electronic device relative to the second epidermal electronic device. The method also includes identifying a computer-recognizable input event correlated to the determined movement, and performing a computer function associated with the computer-recognizable input event.

Further, a computer program product including a computer readable storage medium readable by a processor and storing instructions for execution by the processor is provided for performing a method that includes: detecting movement of a first epidermal electronic device relative to a second epidermal electronic device based on electronic signals of the first and second epidermal electronic devices. The first epidermal electronic device is associated with a first portion of a body of a user and the second epidermal electronic device is associated with a second portion of the body of the user. The method further includes determining movement of the first portion of the body of the user relative to the second portion of the body of the user based on the detected movement of the first epidermal electronic device relative to the second epidermal electronic device. The method also includes identifying a computer-recognizable input event correlated to the determined movement, and performing a computer function associated with the computer-recognizable input event.

Yet further, a computer system is provided that includes a memory and a processor in communications with the memory, wherein the computer system is configured to perform a method including: detecting movement of a first epidermal electronic device relative to a second epidermal electronic device based on electronic signals of the first and second epidermal electronic devices. The first epidermal electronic device is associated with a first portion of a body of a user and the second epidermal electronic device is associated with a second portion of the body of the user. The method further includes determining movement of the first portion of the body of the user relative to the second portion of the body of the user based on the detected movement of the first epidermal electronic device relative to the second epidermal electronic device. The method also includes identifying a computer-recognizable input event correlated to the determined movement, and performing a computer function associated with the computer-recognizable input event.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
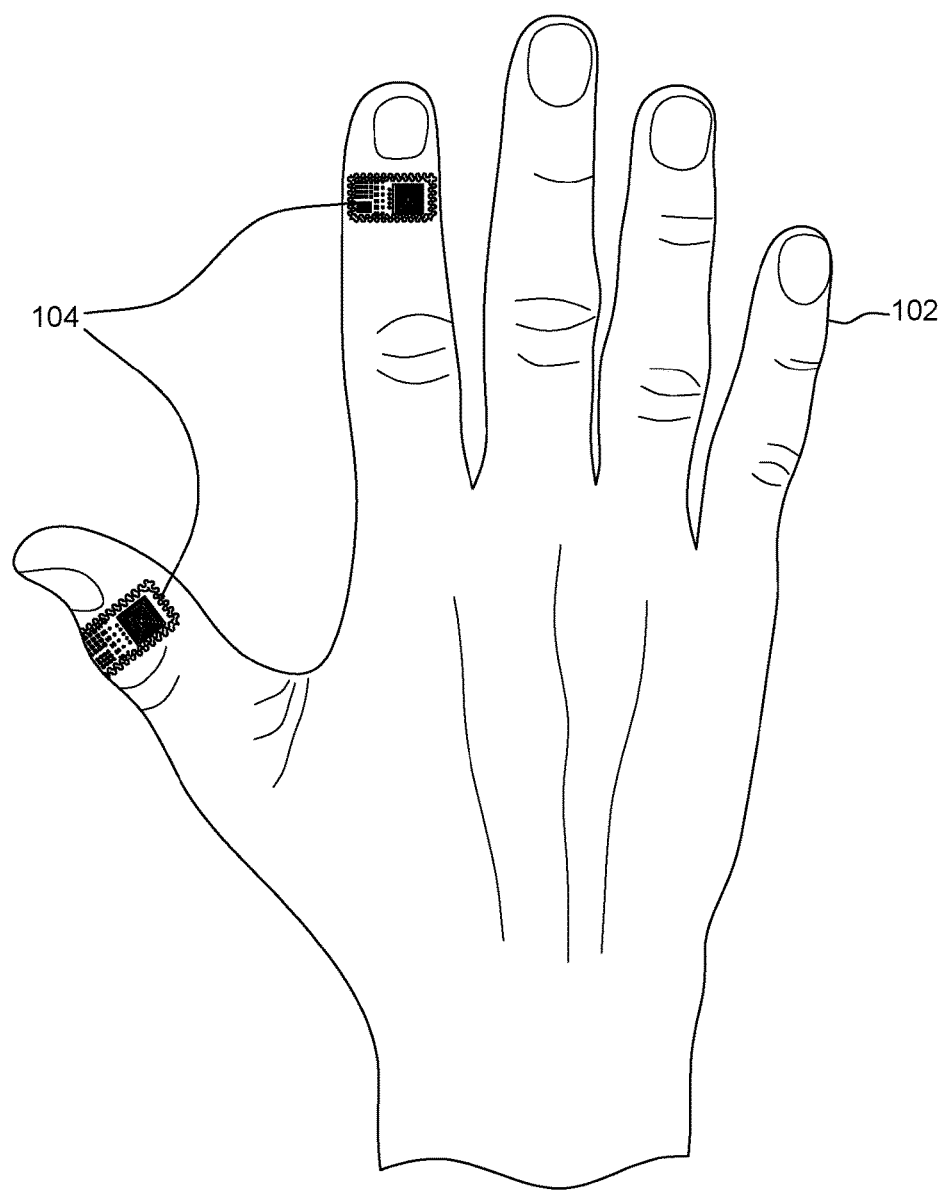
FIG. 1 depicts an example of epidermal electronic devices affixed to a user's hand in accordance with aspects described herein.

Aspects described herein leverage epidermal electronic devices to provide opportunities and facilities enabling a user to use portions of the user's body, such as fingers, to control a computer system from a distance. This provides a more user-friendly experience for the user in part by eliminating the need for the user to physically touch a trackpad or touchscreen, as examples, coupled to the computer system.

Epidermal electronic devices refer to a thin layer of electronic circuits, typically surface-mounted on a user's skin or embedded in/under the user's skin, having data processing, environment sensing, and/or other capabilities. An epidermal electronic device usually includes several circuits having tailored functions, such as a processor or processing circuit for processing data, memory circuits/cells for data storage, a power supply circuit, antenna and network (Wi-Fi or other wireless communication) circuit for data transfer, and temperature, heartrate and/or other environmental, physiological, biological, and/or biometric sensors. An epidermal electronic device may include additional or alternative types of circuits. The device may be powered inductively, via solar energy, or in other ways, and are typically stretchable and flexible so that they do not break or damage from user movement, contact, stress, or pressure. An example type of epidermal electronic device is an electronic tattoo or "e-tattoo". E-tattoos are typically temporarily affixed to the surface of the user's skin, delivered on/in a sticker or film and pasted, laminated, or stuck onto the user's skin, such as on the user's arm or finger. An e-tattoo or other epidermal electronic device could instead be embedded partially or wholly in/under the user's skin. Epidermal electronic devices can gather data on a real-time basis and share it with a remote device, such as a user's smartphone, other mobile device, or other type of computer system. Some e-tattoos serve as a microelectronic health monitor.

In accordance with aspects described herein, a user can attach epidermal electronic device(s) to portions of the user's body, e.g. the user's finger(s), such as the user's thumb and index finger of a hand. The epidermal electronic devices can generate signals indicating relative movement (e.g., direction, distance, speed and force of fingers) between the epidermal electronic devices that are pasted or affixed to the user's fingers and mapping the relative movements to control various computer system functionalities, such as (but not limited to) providing pointer input (click, drag, hover, etc), scrolling pages, turning a page, pushing a digital object with force, drawing diagrams, lines, changing thickness or size of objects, as examples. By relative movement is meant movement of one epidermal electronic device relative to one or more other epidermal electronic device(s) or other reference points.

In some examples, a respective epidermal electronic device is affixed to each of the user's thumb and index finger of the user's hand. When the user controls a computer system, such as one configured to receive input from one or both of the epidermal electronic devices, the user will supply input by, e.g., rubbing together the fingers with the epidermal electronic devices associated therewith. Rubbing is just one example of relative movement between two (or more) epidermal electronic devices. The relative movement, e.g. rubbing the two fingers together, changes the position of the two (or more) fingers with respect to each other, and therefore the epidermal electronic devices that are affixed to the fingers. This relative movement of the epidermal electronic devices can be detected to determine movement of the associated fingers, which be mapped and correlated to different computer functionalities. Accordingly, the user can control the computer system by, e.g., rubbing the fingers over each other. Circuit(s) present in one or more epidermal electronic devices can track the relative movement between the fingers and can communicate with the computer system to execute an appropriate operation from a distance. The epidermal electronic devices may be considered part of the computer system that is being controlled, or the epidermal electronic devices may alternatively be part of another computer system or considered their own computer system that is used to control another computer system.

Thus, the epidermal electronic devices themselves can effectively measure the relative movement between portions of the user's body to which the epidermal electronic devices are affixed or into which the epidermal electronic devices are embedded. The epidermal electronic devices may, for example, send and receive near-field communication (NFC) signals between each other, and based on the signal strength variation between the NFC circuits in the epidermal electronic devices, the epidermal electronic devices can determine relative position of one body portion (e.g. a finger) with respect to one or more other body portions (e.g. other finger(s)). This capture of the relative movement of the body portions by tracking the NFC signal variations between epidermal electronic device circuits can then be used to indicate various computer functionalities to control the computer system, providing an enhanced Human-Computer Interaction facility and experience.

This is distinct from other approaches, for instance an approach that captures images of a user with a camera and identifies various computer gestures that the user performs to control various computer functionality. Such an approach does not detect relative movement of the body portions involved, for example. In contrast, aspects described herein provide that epidermal electronic devices are used to detect relative movement of body portions. This does not necessitate any additional imaging device to monitor, ascertain, and/or estimate (perhaps erroneously) the movement and depth using camera/depth-sensor devices of the body portions. Aspects described herein are more effective and capable of capturing finer movement detail while being more cost effective. Meanwhile, the user experience is enhanced because accurate movement detection enables easy, accurate, and improved control of the computer system.

FIG. 1 depicts an example of epidermal electronic devices affixed to a user's hand in accordance with aspects described herein. In this example, a respective epidermal electronic device 104 is affixed (pasted, laminated, stuck, etc.) on each of the user's thumb and index fingers of the user's hand 102. Based on the epidermal electronic devices being associated with the thumb and index fingers, once the user moves these two fingers, there will be a change in relative position between the two fingers and therefore the associated epidermal electronic devices 104.

Figure 2:
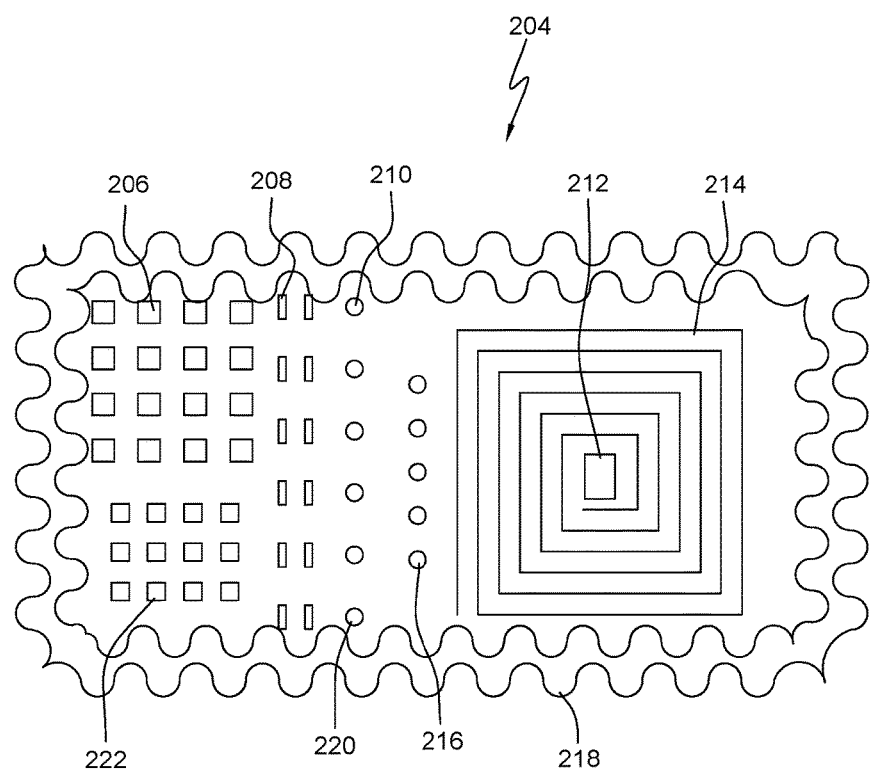
FIG. 2 depicts an example epidermal electronic device for incorporating and/or using aspects described herein.

FIG. 2 depicts an example epidermal electronic device for incorporating and/or using aspects described herein. Epidermal electronic device 204 is a generally rectangular arrangement of circuits each tailored for performing respective functions for various applications. The circuits depicted in FIG. 2 include electrocardiography (ECG) sensor(s) 206 for sensing electrical and muscular functions of the heart, temperature sensor(s) 208 for sensing ambient, environmental and/or user body temperature, strain gauge(s) 210 for detecting flexion or other strain on the device 204, light emitting diode (LED) 212 for emitting light, for instance to convey an operating state or status (low power, charging, standby, etc.) of the device 204, wireless power cell 214 for harvesting and/or storing power, wireless communications oscillator 216 and wireless antenna 218 for wireless data transfer (transmission/receipt), light sensors 220 for detecting light, and electroencephalography (EEG)/electromyography (EMG) sensor(s) 222 for measurement of electrical activity in parts of the brain. Additional or alternative circuits that may be included in epidermal electronic device 204 include one or more processors, memory, and/or NFC circuits for radio-frequency (RF) or other type of near-field communication.

Figure 3A:
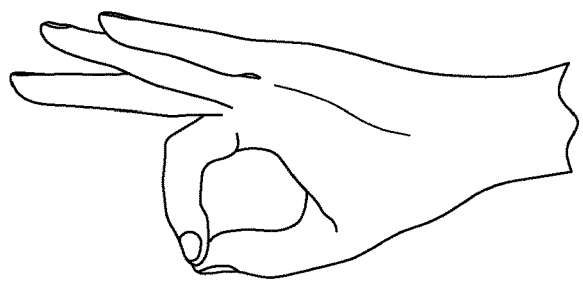
FIGS. 3A-3C depict example gestures involving movement of a first finger relative to a second finger in accordance with aspects described herein.
Figure 3B:
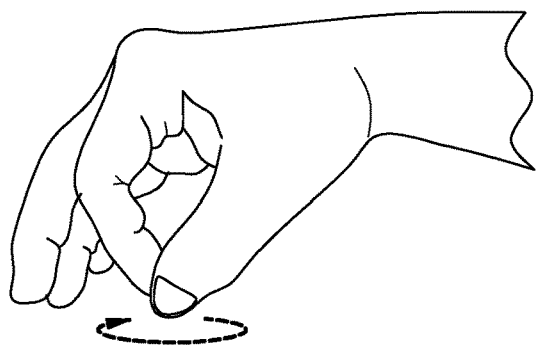
Figure 3C:

FIGS. 3A-3C depict example gestures involving movement of a first finger relative to a second finger in accordance with aspects described herein. They demonstrate examples of how a user can use both fingers to perform different types of gestures.

The user can apply force (FIG. 3A) to one or more fingers, for instance by touching or squeezing the fingertips together as depicted. Registration of an input can be based on detection of signals from stress/pressure sensors in the epidermal electronic devices, and/or based on a duration/pressure of the contact between the fingers. As shown in FIG. 3B, the user is rubbing one finger over the other finger. This action can similarly be sensed by touch, stress, or pressure sensor(s) of the epidermal electronic devices. Rotation or other change in orientation of a finger, or movement or change in velocity/speed of a finger can similarly be detected. In FIG. 3C, the user initially touches the fingertips together and then moves the index finger downward, such as by pulling the index fingertip away from the tip of the thumb or sliding the index fingertip down the tip of the thumb toward the palm. The epidermal electronic devices can be positioned on the user's fingers (in these examples) in any desired location that would enable detection of the gestures and movements. In some examples, the epidermal electronic devices are positioned such that contact between fingers is made where the epidermal electronic devices are situated, though in other examples the epidermal electronic devices are affixed elsewhere while still being able to detect the user's finger activities.

The epidermal electronic devices fixed to the body portion(s) may move along with movement of those body portions. So, for instance, based on the user moving the fingers, the epidermal electronic devices may also move (relative to each other or some other reference point, such as the center of the user's palm). Software installed either on epidermal electronic device(s) or on a computer system in communication with the epidermal electronic device(s) can track the relative movement of the epidermal electronic devices and accordingly execute appropriate mapped functions in a computer system.

Relative finger movements can be mapped or correlated to computer-recognizable input events. These correlations can be stored in the computer system to perform the computer function, or another computer system, for instance one that gives direction to the computer system to perform the computer function. Example input events include pointer (e.g. mouse) events. Example such pointer events and correlations to epidermal electronic device movement are set forth below:

Pointer event: "Mouse Up"
  Corresponding epidermal electronic device event: Touch-release event between two or more epidermal electronic devices. For instance, a touch (of the user's body portions and/or the associated epidermal electronic devices) is sensed followed by a release within a timeframe, such as 1 second.
Pointer event: "Mouse Down"
  Corresponding epidermal electronic device event: Touch event between two or more epidermal electronic devices. For instance a sustained touch (of the user's body portions and/or the associated epidermal electronic devices) is sensed for a sustained amount of time, such as more than 1 second.
Pointer event: "Mouse click"
  Corresponding epidermal electronic device event: Touch+Touch-release event between two or more epidermal electronic devices. For example, a touch event (e.g. a sustained touch as above) is sensed followed by a touch-release event (e.g. a brief touch and release as above) within a timeframe of, e.g., two seconds.
Pointer event: "Mouse Hover (move pointer on the display to a desired location)
  Corresponding epidermal electronic device event: A first epidermal electronic device acts as reference and a second epidermal electronic device acts as a mouse ball. Based on the relative movement between the reference (first epidermal electronic device) and second epidermal electronic device, the mouse hover event occurs in which the pointer is relocated as controlled by movement of the second epidermal electronic device relative to the first epidermal electronic device.
Pointer event: Content transfer from one location to another (drag)
  Corresponding epidermal electronic device event: Move a first body portion from a second body portion to a third body portion. For example, touch the thumb to the index finger and then move the thumb to the middle finger.

The above presents mappings or correlations between epidermal electronic device events as recognized relative movements between standard pointer events. In some examples, these events can be used as building blocks for other complex events (as in the example of the Touch+Touch-release event above).

Additionally or alternatively, users may be able to configure custom special epidermal electronic device events and corresponding pointer or other input event events using the relative movements, such as:

Movement of a finger in clockwise or counter-clockwise direction relative to another finger;
  Force applied by one finger on another finger, e.g. to push/transfer one digital object from one device (computer system) to another device (computer system)
  Use of epidermal electronic devices associated with several body portions, such as 3 or more fingers, relative movements between two fingers (in this example are correlated with a particular epidermal electronic device event that is triggered based on movement the third finger.

In some examples, speed of a movement can factor into which computer-recognizable input event is identified. For instance, in determining the movement of the first finger relative to the second finger, this can include determining a speed of the movement of the first finger relative to the second finger. Different speeds of a particular movement/maneuver can correlate to different computer-recognizable input events. One or more speed thresholds can be configured to invoke different input events. By way of specific example, if the speed of a relative movement is below a threshold speed, the identified input event may be a regular scroll or 'mouse down' event. If the speed of the relative movement is at or above the threshold speed, then the input event may be a quick/fast scroll event. Identifying an input event correlated to the determined movement may therefore be based at least in part on the determined speed of the movement.

An example process for determining relative movement between epidermal electronic devices (movement of one epidermal electronic device relative to one or more others) is provided as follows: Each epidermal electronic device is affixed to or embedded at least partially within a respective finger, for instance pasted on, under, or near a fingernail of a respective finger. The epidermal electronic devices receive/transmit near-field communication (NFC) and/or other communication signals from, e.g., NFC or other communication circuits. These signals can be received/detected by, e.g., NFC or other communication circuits, for instance of the epidermal electronic devices or of a separate computer system. Based on the signal strength variation between NFC or other communications circuits, positioning of one finger can be modeled or identified relative to another finger. An example of determining relative position based on signal strength variation is Wi-Fi triangulation for indoor positioning identification. By analyzing the relative movement of fingers, direction, distance, stress, pressure, touch, etc. relative to a reference (such as another epidermal electronic device) can be determined.

NFC provides a relatively low-power, efficient option for a wireless channel to support communication with the epidermal electronic devices. Some epidermal electronic devices do not require external power; they can harvest power directly from user movement and/or solar energy, and/or include a biobattery such as one that generates power from the user's perspiration, as examples.

An example process in accordance with aspects described herein to control a computer system is as follows: A user affixes two epidermal electronic devices to two fingers of the user's hand, such as the thumb and index finger. The epidermal electronic devices may be affixed near the finger nails of each finger, as an example. The user rubs the user's fingers over/against each other, providing movement of one epidermal electronic device relative to the other and potentially providing detectable pressure, stress, or contact that is detectable by the epidermal electronic device(s). The circuits of the epidermal electronic devices, since affixed to the body portions, move along with those body portions. Consequently, the relative movement of the fingers will create relative movement on the epidermal electronic devices.

Unique epidermal electronic device identifiers (IDs) may be configured with a computer system of which the epidermal electronic devices are a part or with which the epidermal electronic devices communicate. The computer system may be a computer system that the user is attempting to control by moving the body portions with which the epidermal electronic devices are associated. There can be a mapping between detectable relative movement of the epidermal electronic devices and specific computer functions. For instance, the movement(s) can be correlated to computer-recognizable input events (such as pointer events) that, when invoked, executed, or handled by the computer system cause the computer system to perform one or more functions that are associated with the computer-recognizable input event. Thus, the computer system can receive, e.g. from one or more epidermal electronic device or based on the signals from one or more epidermal electronic device, a signal of relative movement of the epidermal electronic devices and accordingly perform an appropriate computer function.

Figure 4:
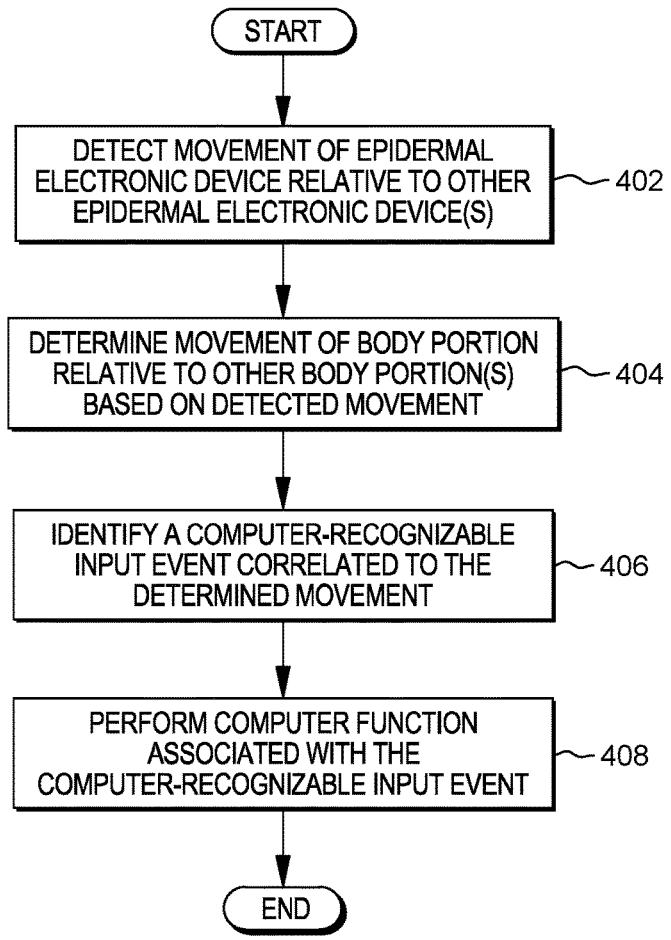
FIG. 4 depicts an example process for controlling a computer system using epidermal electronic devices, in accordance with aspects described herein.

Accordingly, FIG. 4 depicts an example process for controlling a computer system using epidermal electronic devices, in accordance with aspects described herein. In some examples, the process of FIG. 4 or particular aspects thereof are performed by one or more computer system(s), such as the computer system being controlled, one or more of the epidermal electronic devices, one or more other computer system(s) with which the epidermal electronic devices and the computer system being controlled are in communication, or a combination of the foregoing computer systems.

The process begins by detecting movement of an epidermal electronic device relative to other epidermal electronic devices (402), such as movement of a first epidermal electronic device relative to a second epidermal electronic device. This movement may be detected based on electronic signals of the first and second epidermal electronic devices. The electronic signals may include near-field communication of near-field communication circuits of the first and second epidermal electronic devices. Additionally or alternatively, the electronic signals may include another type of wireless communication signals of other types of communication circuits of the epidermal electronic devices. In some examples, detecting movement of the first epidermal electronic device relative to the second epidermal electronic device includes tracking signal strength variations between the near-field communication signals. The first epidermal electronic device is associated with a first portion of a body of a user and the second epidermal electronic device is associated with a second portion of the body of the user. In some examples, the first epidermal electronic device and/or the second epidermal electronic device is an electronic tattoo.

The process continues by determining movement of the first portion of the body of the user relative to the second portion of the body of the user based on the detected movement of the first epidermal electronic device relative to the second epidermal electronic device (404). The epidermal electronic device associated with a portion of the user's body may move with movement of that portion of the user's body. Accordingly, movement of the epidermal electronic device may be correlated to corresponding movement by that body portion, so that detecting movement in the epidermal electronic devices can indicate movement of the body portions.

The first portion of the body of the user may be a first finger of the user and the second portion of the body of the user may be a second finger of the user. Consequently, the determined movement of the first portion of the body of the user relative to the second portion of the body of the user can include movement of the first finger relative to the second finger. In some such examples, the first epidermal electronic device is affixed-to or embedded in the first finger of the user and the second epidermal electronic device is affixed-to or embedded in the second finger of the user.

The movement of the first finger relative to the second finger can compose (form or act out) a hand gesture. Additionally or alternatively, the movement of the first finger relative to the second finger can include contact between the first finger and the second finger, such as rubbing of the one finger against the other, tapping, or touching the fingers together. Additionally or alternatively, the movement of the first finger relative to the second finger can include pressure exerted against the first finger by the second finger for a detectable amount of time, such as sustained pressure sustained for a duration of two seconds. Additionally or alternatively, the movement of the first finger relative to the second finger may be selected from the group consisting of:

- a change in orientation of the first finger relative to the second finger—for instance a finger rotates or repositions relative to another finger;
- a change in velocity of the first finger—for instance a finger is detected to accelerate in a particular direction; and/or
- a change in distance between one finger and another finger.

The process of FIG. 4 continues by identifying a computer-recognizable input event correlated to the determined movement of the first portion of the user's body relative to the second portion of the user's body (406). The computer-recognizable input event can include any kind of input-related event such as a pointer event. An example pointer event is a mouse event, such as 'mouse up', 'mouse down', 'click', or 'hover/position' event to position the pointer at a particular location.

In some examples, determining the movement of the first finger relative to the second finger includes determining a speed of the movement of the first finger relative to the second finger, where different speeds of the movement correlate to different computer-recognizable input events. Identifying the computer-recognizable input event correlated to the determined movement may be based at least in part on the determined speed of the movement. For instance, one input event may be correlated to speeds at or above a threshold and if the speed of the movement is determined to be at or above the threshold speed, then the one input event may be identified. Meanwhile another input event may be correlated to speeds below the threshold and if the speed of the movement is determined to be below this threshold speed, then the another input event may be identified.

The process then performs a computer function associated with the computer-recognizable input event (408) and ends. The computer function is performed by a computer system, which may be a computer system configured to receive signals from one or more epidermal electronic devices. In some examples, the computer system performs the detecting, determining, identifying, and performing the computer function. In other examples, the computer system performing the computer function may be a computer system configured to receive the computer-recognizable input event or indication thereof from another computer system, such as one or more of the epidermal electronic devices themselves, or another computer system that performs the detecting, determining, and identifying, and then provides a signal to the computer system to perform the function. In a specific embodiment, the epidermal electronic devices are in communication with a user's mobile device, such as a smartphone, tablet, or wearable mobile device, and that mobile device is the computer system on which the computer function associated with the computer-recognizable input event is to be performed. The user's mobile device may receive electronic signals from the epidermal electronic device(s) and detect, based on those signals, the movement of the epidermal electronic devices, then determine the movement of the body portions relative to each other, then identify the computer-recognizable input event and perform the computer function. Alternatively, the user's mobile device may receive from an epidermal electronic device or another computer system an indication of the computer function to perform, the computer-recognizable input event, or an indication of the determined movement of the body portions. Consequently, aspects of the process of FIG. 4 may be performed by one or more entities, which may collectively form one or more computer systems. In some examples, all such entities may be considered part of a (single) computer system that comprises each of the entities, which themselves may be or include computer systems.

The computer-recognizable input event may be an input event that a computer system uses to invoke a particular computer function. In some examples, the computer-recognizable input event is fed to an event receiver to provide to a specific application executing on the computer system, such as an application that is currently in focus, to perform a computer function. In one example, a 'mouse down' computer-recognizable input event might result in the computer system performing a computer function of scrolling down on a webpage displayed in a web browser program executing on the computer system.

According to additional or alternative aspects, a third epidermal electronic device may be associated with a third portion of the body of the user, such as a third finger of the user. The third epidermal electronic device can be affixed-to or embedded in the third finger. The third epidermal electronic device can serve as the trigger to perform the event that is identified from the movement of the first and second epidermal electronic devices on the first and second fingers. Thus, in an additional aspect, the process can further include detecting movement of the third epidermal electronic device based on movement of the third portion of the body of the user, and based on detecting the movement of the third epidermal electronic device, triggering the identified computer-recognizable input event correlated to the determined movement, in order to trigger the performing the computer function. As an example, recognition of a particular movement (such as a curl or flick) of this third finger can serve as a trigger to realize the identified computer-recognizable input event, e.g. to trigger performance of the associated computer function.

In other examples, particular relative movement between two body portions (e.g. fingers) can be correlated to different computer-recognizable input events depending on movement, gesture, or positioning of a third body portion (e.g. a third finger). By way of specific example, a long-press of the first two fingers together may convey a different input event depending on what movement, etc. is detected from the third finger at the time of the relative movement between the first two fingers.

Processes described herein may be performed singly or collectively by one or more computer systems, such as computer system(s) described below with reference to FIG. 5. In some embodiments, such a computer system may be or include the subject one or more epidermal electronic devices, or may be a computer system in communication with one or more epidermal electronic devices, such as the computer system to perform the computer function.

Figure 5:
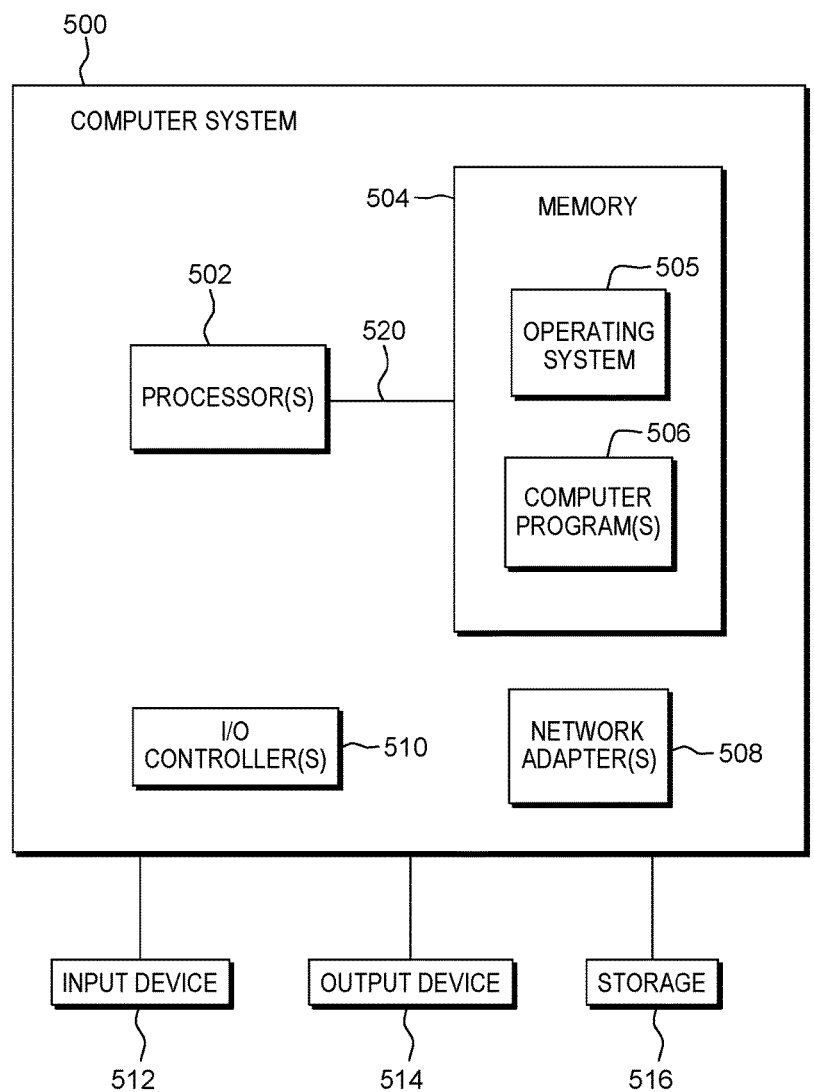
FIG. 5 depicts an example of a computer system to incorporate and/or use aspects described herein.

FIG. 5 depicts one example of a computer system to incorporate and/or use aspects described herein. A computer system may also be referred to herein as a data processing device/system or computing device/system, or simply a computer. Computer system 500 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, pointing devices, keyboards, accelerometers, gyroscopes, magnetometers, light sensors, proximity sensors, GPS devices, cameras, etc.) may be coupled to the system either directly or through I/O controllers 510.

Network adapter(s) 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer systems.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 6:
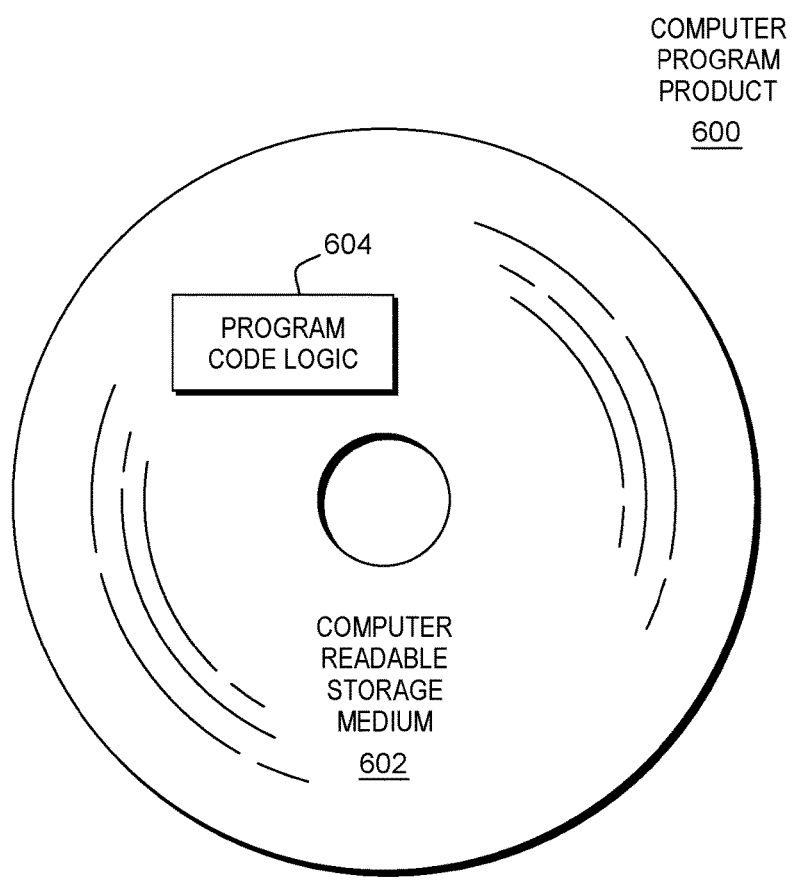
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    detecting movement of a first epidermal electronic device relative to a second epidermal electronic device based on electronic signals of the first and second epidermal electronic devices, the first epidermal electronic device being associated with a first portion of a body of a user and the second epidermal electronic device being associated with a second portion of the body of the user;
    determining movement of the first portion of the body of the user relative to the second portion of the body of the user based on the detected movement of the first epidermal electronic device relative to the second epidermal electronic device;
    identifying a computer-recognizable input event correlated to the determined movement; and
    performing a computer function associated with the computer-recognizable input event, wherein a third epidermal electronic device is associated with a third portion of the body of the user, wherein the movement of the first portion of the body of the user relative to the second portion of the body of the user composes a gesture, wherein the composed gesture correlates to a plurality of different computer-recognizable input events, each associated with different trigger gesture properties, and wherein the method further comprises:
        detecting a trigger gesture as movement of the third epidermal electronic device based on movement of the third portion of the body of the user;
        determining the gesture composed by the movement of the first portion of the body of the user relative to the second portion of the body of the user;
        identifying the computer-recognizable input event, from the plurality of different computer-recognizable input events to which the composed gesture correlates, based on one or more properties of the trigger gesture; and
        triggering performance of the computer function associated with the identified computer-recognizable input event.

2. The method of claim 1, wherein the electronic signals of the first and second epidermal electronic devices comprise near-field communication signals of near-field communication circuits of the first and second epidermal electronic devices, and wherein the detecting movement of the first epidermal electronic device relative to the second epidermal electronic device comprises tracking signal strength variations between the near-field communication signals.

3. The method of claim 1, wherein the first portion of the body of the user is a first finger of the user and the second portion of the body of the user is a second finger of the user, wherein the determined movement of the first portion of the body of the user relative to the second portion of the body of the user comprises movement of the first finger relative to the second finger.

4. The method of claim 3, wherein the first epidermal electronic device is affixed-to or embedded in the first finger of the user and the second epidermal electronic device is affixed-to or embedded in the second finger of the user.

5. The method of claim 3, wherein the movement of the first finger relative to the second finger comprises contact between the first finger and the second finger.

6. The method of claim 3, wherein the movement of the first finger relative to the second finger comprises pressure exerted against the first finger by the second finger.

7. The method of claim 3, wherein the movement of the first finger relative to the second finger is selected from the group consisting of: a change in orientation of the first finger relative to the second finger, a change in velocity of the first finger, and a change in distance between the first finger and the second finger.

8. The method of claim 3, wherein determining the movement of the first finger relative to the second finger comprises determining a speed of the movement of the first finger relative to the second finger, wherein different speeds of the movement correlate to different computer-recognizable input events, and wherein identifying the computer-recognizable input event correlated to the determined movement is based at least in part on the determined speed of the movement.

9. The method of claim 1, wherein the first epidermal electronic device and the second epidermal electronic device are electronic tattoos.

10. The method of claim 1, wherein the computer-recognizable input event comprises a pointer event.

11. A computer program product comprising:
    a computer readable storage medium readable by a processing circuit and storing instructions for execution by the processing circuit for performing a method comprising:
        detecting movement of a first epidermal electronic device relative to a second epidermal electronic device based on electronic signals of the first and second epidermal electronic devices, the first epidermal electronic device being associated with a first portion of a body of a user and the second epidermal electronic device being associated with a second portion of the body of the user;

determining movement of the first portion of the body of the user relative to the second portion of the body of the user based on the detected movement of the first epidermal electronic device relative to the second epidermal electronic device;

identifying a computer-recognizable input event correlated to the determined movement; and performing a computer function associated with the computer-recognizable input event, wherein a third epidermal electronic device is associated with a third portion of the body of the user, wherein the movement of the first portion of the body of the user relative to the second portion of the body of the user composes a gesture, wherein the composed gesture correlates to a plurality of different computer-recognizable input events, each associated with different trigger gesture properties, and wherein the method further comprises:

detecting a trigger gesture as movement of the third epidermal electronic device based on movement of the third portion of the body of the user;

determining the gesture composed by the movement of the first portion of the body of the user relative to the second portion of the body of the user;

identifying the computer-recognizable input event, from the plurality of different computer-recognizable input events to which the composed gesture correlates, based on one or more properties of the trigger gesture; and triggering performance of the computer function associated with the identified computer-recognizable input event.

12. The computer program product of claim 11, wherein the electronic signals of the first and second epidermal electronic devices comprise near-field communication signals of near-field communication circuits of the first and second epidermal electronic devices, and wherein the detecting movement of the first epidermal electronic device relative to the second epidermal electronic device comprises tracking signal strength variations between the near-field communication signals.

13. The computer program product of claim 11, wherein the computer-recognizable input event comprises a pointer event.

14. A computer system comprising:
a memory; and
a processor in communication with the memory, wherein the computer system is configured to perform a method, the method comprising:

detecting movement of a first epidermal electronic device relative to a second epidermal electronic device based on electronic signals of the first and second epidermal electronic devices, the first epidermal electronic device being associated with a first portion of a body of a user and the second epidermal electronic device being associated with a second portion of the body of the user;

determining movement of the first portion of the body of the user relative to the second portion of the body of the user based on the detected movement of the first epidermal electronic device relative to the second epidermal electronic device;

identifying a computer-recognizable input event correlated to the determined movement; and performing a computer function associated with the computer-recognizable input event, wherein a third epidermal electronic device is associated with a third portion of the body of the user, wherein the movement of the first portion of the body of the user relative to the second portion of the body of the user composes a gesture, wherein the composed gesture correlates to a plurality of different computer-recognizable input events, each associated with different trigger gesture properties, and wherein the method further comprises:

detecting a trigger gesture as movement of the third epidermal electronic device based on movement of the third portion of the body of the user;

determining the gesture composed by the movement of the first portion of the body of the user relative to the second portion of the body of the user;

identifying the computer-recognizable input event, from the plurality of different computer-recognizable input events to which the composed gesture correlates, based on one or more properties of the trigger gesture; and triggering performance of the computer function associated with the identified computer-recognizable input event.

15. The computer system of claim 14, wherein the electronic signals of the first and second epidermal electronic devices comprise near-field communication signals of near-field communication circuits of the first and second epidermal electronic devices, and wherein the detecting movement of the first epidermal electronic device relative to the second epidermal electronic device comprises tracking signal strength variations between the near-field communication signals.

16. The computer system of claim 14, wherein the computer-recognizable input event comprises a pointer event.

* * * * *